Aug. 29, 1933.   G. A. BOCKMAN   1,924,831
VALVE LOCKING MEANS
Filed July 21, 1930
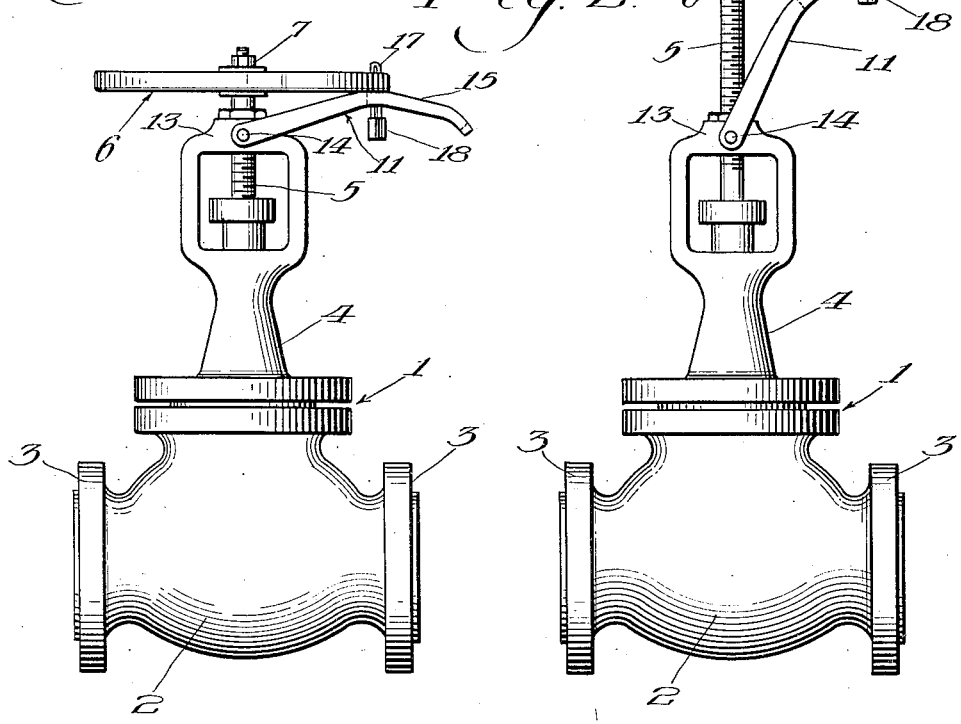
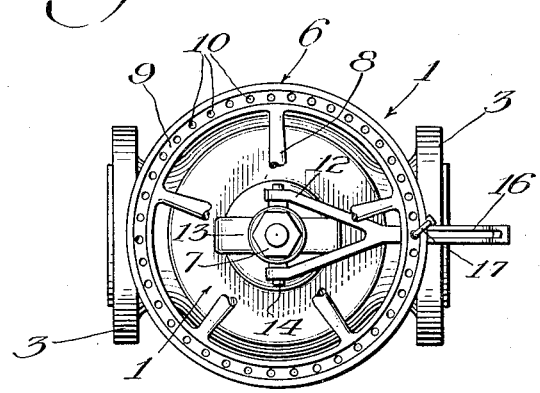

Patented Aug. 29, 1933

1,924,831

UNITED STATES PATENT OFFICE 1,924,831

VALVE LOCKING MEANS

George A. Bockman, Chicago, Ill., assignor to Universal Oil Products Company, Chicago, Ill., a corporation of South Dakota Application July 21, 1930. Serial No. 469,481

3 Claims. (Cl. 70—123)

This invention relates to improvements in a locking device for valves, and refers particularly to the provision of means for locking the valve wheel of a valve at any position of rotation of said wheel and/or at any height or depression of the valve stem.

The utility, objects and advantages of my invention will be apparent from the accompanying drawing and following detail description.

In the drawing, Fig. 1 is a side elevational view of a valve provided with my locking device.

Fig. 2 is a view similar to Fig. 1 with the valve stem at a different height.

Fig. 3 is a top plan view, parts being broken away, of a valve equipped with my invention.

Referring more in detail to the drawing, 1 indicates a valve which may take the form of a globe valve, gate valve or any other conventional type valve, which may be provided with a body portion 2 having flanges 3 by which means said valve may be interposed in a pipe line (not shown), the flow of fluid through which is to be controlled. A standard or bonnet 4 may be mounted upon the upper portion of the body 2 in any suitable manner and may be adapted to serve as a supporting means or journalling means for a threaded stem 5. A valve wheel 6 may be mounted at the upper extremity of stem 5 and may be retained thereon by lock nut 7. Said valve wheel may be provided with conventional spokes 8 and the rim 9 thereof may be provided with a plurality of apertures 10 disposed in said rim at equal intervals around the periphery thereof.

In practise it is frequently desirable when a valve has once been set in a desired position that said setting be maintained for a predetermined length of time. It also may be desirable in some instances to prevent manipulation of a valve which may be accessible to unskilled persons or those unauthorized to manipulate said valve. In setting the usual valve if the pipe line in which the valve may be disposed is subjected to vibrations or impacts it sometimes happens that the valve setting may be changed due to such vibrations, which may result in an undesirable difference in flow of fluid through the pipe line in which said valve is interposed.

Accordingly, my invention is particularly directed to the provision of means for maintaining a valve when once set in such set position. To accomplish this result I may provide an arm 11 which may terminate at one end in a bifurcated prong 12, which in turn may be pivotally connected to the upper portion 13 of the bonnet 4. The opposite extremity of arm 11 may be bent, as shown best at 15 in Figs. 1 and 2, and said end of the arm may be provided with an elongated longitudinal slot 16.

In operation, the valve 1 may be set at a predetermined position by suitably manipulating valve wheel 6. When such position has been determined arm 11 may be rotated upwardly until the end 15 of said arm comes in contact with the lower surface of the arm 9. The wheel 6 may then be rotated either to the right or left a relatively small degree until one of the apertures 10 registers with slot 16, the amount of such additional rotation being dependent upon the distance between adjacent apertures in the rim 9. A loop 17 of a padlock 18 may then be inserted through slot 16 and its registering aperture 10 and the padlock may then be locked. It is apparent that by this arrangement valve wheel 6 will be restrained from any motion of rotation, and hence the valve will be effectively locked in the position originally set.

By referring particularly to Figs. 1 and 2 it can be seen that by appropriately bending the end 15 of arm 11 slot 16 in arm 11 may be brought into proximity with rim 9. In this manner valve wheel 6 may be effectively locked regardless of the height or depression of stem 5.

It is to be understood, of course, that my invention may be applied to any conventional type of valve and that I do not wish to be limited to the particular locking means shown, since many equivalents may be substituted for padlock 18 herein illustrated. I am aware that many other modifications in the details of construction may be varied without departing from the spirit of my invention and hence I do not wish to be limited except as necessitated by the prior art.

I claim as my invention:

1. In combination, a valve, a bonnet upon said valve for supporting a valve stem, a valve wheel mounted upon said valve stem, means associated with the valve wheel and the remaining portion of the valve for locking said wheel in a predetermined position, comprising an arm pivotally connected to said bonnet, the opposite end of said arm being provided with a slot which registers with one of a plurality of apertures provided in the rim of the valve wheel, and means passing through said slot and said registering aperture for locking said wheel with respect to said arm.

2. In combination, a valve, a bonnet upon said valve for supporting a valve stem, a valve wheel mounted upon said valve stem, means associated with the valve wheel and the remaining portion of the valve for locking said wheel in a predetermined position, comprising an arm pivotally connected to said bonnet, the opposite end of said arm being curved and provided with a slot which registers with one of a plurality of apertures provided in the rim of the valve wheel, and means passing through said slot and said registering aperture for locking said wheel with respect to said arm.

3. In combination, a valve, comprising a body, a bonnet, a valve stem and a valve wheel mounted upon said stem, said wheel being provided with a plurality of apertures, an arm pivotally associated with the valve proper and provided at one end with a slot, and means removably disposed in said slot and one of said apertures for locking the wheel with respect to said arm at substantially any position of the wheel.

GEORGE A. BOCKMAN.